United States Patent
Lim

(10) Patent No.: US 10,725,265 B2
(45) Date of Patent: Jul. 28, 2020

(54) METHOD AND SYSTEM FOR ADJUSTING FOCUSING LENGTH TO ENHANCE VISION

(71) Applicants: NHN Entertainment Corporation, Seongnam-si (KR); NHN Studio629 Corporation, Seongnam-si (KR)

(72) Inventor: Chuljae Lim, Seongnam-si (KR)

(73) Assignees: NHN Corporation, Seongnam-si (KR); NHN Studio 629 Corporation, Seongnam-si (KR)

( * ) Notice: Subject to any disclaimer, the term of this patent is extended or adjusted under 35 U.S.C. 154(b) by 59 days.

(21) Appl. No.: 15/926,293

(22) Filed: Mar. 20, 2018

(65) Prior Publication Data

US 2018/0275367 A1    Sep. 27, 2018

(30) Foreign Application Priority Data

Mar. 21, 2017 (KR) .................. 10-2017-0035274

(51) Int. Cl.
| | | |
|---|---|---|
| *G02B 7/02* | (2006.01) | |
| *G02B 27/14* | (2006.01) | |
| *G02B 7/04* | (2006.01) | |
| *G06T 19/00* | (2011.01) | |
| *H04N 5/232* | (2006.01) | |
| *H04N 13/236* | (2018.01) | |
| *G02B 7/06* | (2006.01) | |
| *G02B 25/00* | (2006.01) | |
| *G02B 27/01* | (2006.01) | |

(52) U.S. Cl.
CPC .............. *G02B 7/04* (2013.01); *G02B 7/06* (2013.01); *G02B 25/004* (2013.01); *G06T 19/006* (2013.01); *H04N 5/23212* (2013.01); *H04N 13/236* (2018.05); *G02B 27/0172* (2013.01)

(58) Field of Classification Search
CPC .... G02B 3/14; G02B 27/017; G02B 27/0075; G02B 2027/0127; G02B 2027/014; G02B 2027/0178; G02B 2027/0123; G06F 3/011
USPC ...................... 345/633, 7, 419; 359/630, 631
See application file for complete search history.

(56) References Cited

U.S. PATENT DOCUMENTS 7,286,287 B1 * 10/2007 Ofner ..................... G02B 7/002
359/418
2009/0295683 A1 * 12/2009 Pugh .................. G02B 27/0101
345/9

(Continued)

FOREIGN PATENT DOCUMENTS

JP          3148791         3/2001
KR     10-2005-0090880      9/2005

(Continued)

OTHER PUBLICATIONS

Office Action dated Apr. 29, 2019, in Korean Patent Application No. 10-2019-0039328.

*Primary Examiner* — Mahidere S Sahle
(74) *Attorney, Agent, or Firm* — H.C. Park & Associates, PLC

(57) ABSTRACT

A method and system for adjusting focusing length to enhance vision of a user. A method for adjusting focusing length includes controlling an object to be displayed and adjusting a focusing length indicating distance to a lens from a virtual surface where eyes of user are located by changing at least one optical property of then lens based on vision setting information while an object is displayed.

20 Claims, 10 Drawing Sheets

(56) References Cited

U.S. PATENT DOCUMENTS

| | | | |
|---|---|---|---|
| 2012/0127062 A1* | 5/2012 | Bar-Zeev | G02B 3/14 |
| | | | 345/6 |
| 2016/0048021 A1* | 2/2016 | Border | G02B 27/0172 |
| | | | 345/690 |
| 2017/0168307 A1* | 6/2017 | Itani | G02B 27/0172 |

FOREIGN PATENT DOCUMENTS

| | | |
|---|---|---|
| KR | 10-2012-0115630 | 10/2012 |
| KR | 10-1471761 | 12/2014 |
| KR | 10-2015-0056907 | 5/2015 |
| KR | 10-2015-0110475 | 10/2015 |

\* cited by examiner

232

METHOD AND SYSTEM FOR ADJUSTING FOCUSING LENGTH TO ENHANCE VISION

CROSS-REFERENCE TO RELATED APPLICATION

This application claims the priority from and the benefit of Korean Patent Application No. 10-2017-0035274, filed on Mar. 21, 2017, which is hereby incorporated by reference for all purposes as if fully set forth herein.

BACKGROUND

Field

Exemplary embodiments of the invention relate generally to a technology for adjusting focusing length when watching contents relating to VR (Virtual Reality) and AR (Augmented Reality).

Discussion of the Background

Recently, nearsightedness within the population has been increasing. Generally, people have access to monitors for viewing prior to the teenage years and continuing well into their twenties and thirties. Also, outside of the home environment, most people look at close range and cannot look far away because of dense buildings. As a result, the number of nearsightedness cases is increasing among the viewing population, and the need to wear glasses is increasing. Furthermore, as new ways for educating people through TVs and a smartphones are developed, the rates of acquiring various ophthalmologic diseases, such as nearsightedness, astigmatism, intermittent exotropia, and the like in children have been increasing because outdoor activities are decreasing in number, resulting in an increase in the amount of time children are spending watching images for education through a TV, a computer, or a smartphone.

As media has steadily developed over time, not only smartphones but also various AR/VR devices playing media have become more popular, and it is expected that nearsightedness will occur more and more as a result of the increasing use of smartphones and various AR/VR devices, and the like. Likewise, the occurrence of such acquired nearsightedness may be actually reversed, but if left untreated, it may become chronic nearsightedness. Korean Patent Publication No. 10-2005-0090880 (published on Sep. 14, 2005) discloses an apparatus and method for adjusting focus balance in a projection image display device adjusting an artificial degree of balance of a DMD (Digital Micromirror Device) element and projection lens by adjusting the gradient of the DMD element assembly connected to the projection lens mounting unit through adjusting the tightening intensity of mounting screws.

The above information disclosed in this Background section is only for understanding of the background of the inventive concepts, and, therefore, it may contain information that does not constitute prior art.

SUMMARY

Exemplary embodiments of the inventive concepts provide a method and system for adjusting focusing length to decrease or prevent loss of vision of a user by adjusting focusing length even though the user watches contents with wearing AR (Augmented Reality) and VR (Virtual Reality) devices.

Exemplary embodiments of the inventive concepts also provide a method and system for adjusting focusing length to enhance vision by exercising eyes of user for medical purposes based on vision information of a user.

Additional features of the inventive concepts will be set forth in the description which follows, and in part will be apparent from the description, or may be learned by practice of the inventive concepts.

An exemplary embodiment discloses a method for adjusting focusing length implemented by a computer including controlling an object to be displayed and adjusting a focusing length from a lens to a virtual surface where eyes of a user are located by changing at least one optical property of the lens based on vision setting information while an object is displayed.

The adjusting focusing length may include adjusting the focusing length by changing a location of the lens, and adjust the focusing length by changing an amount of current applied to the lens.

The adjusting focusing length may include adjusting the focusing length by changing the location of the lens in order that the focusing length is relatively long from the original location of the lens in order to relax the ciliary muscles in the eyes of the user.

The adjusting focusing length may include adjusting the focusing length by changing the location of the lens in order that the focusing length is relatively short from the original location of the lens in order to contract the ciliary muscles.

According to another exemplary embodiment, a system for adjusting focusing length may include a display controlling unit controlling an object to be displayed, and a focusing length controlling unit for adjusting a focusing length from a lens to a virtual surface where eyes of a user are located by changing at least one optical property of the lens based on vision setting information while an object is displayed.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE ILLUSTRATED EMBODIMENTS

Figure 1:
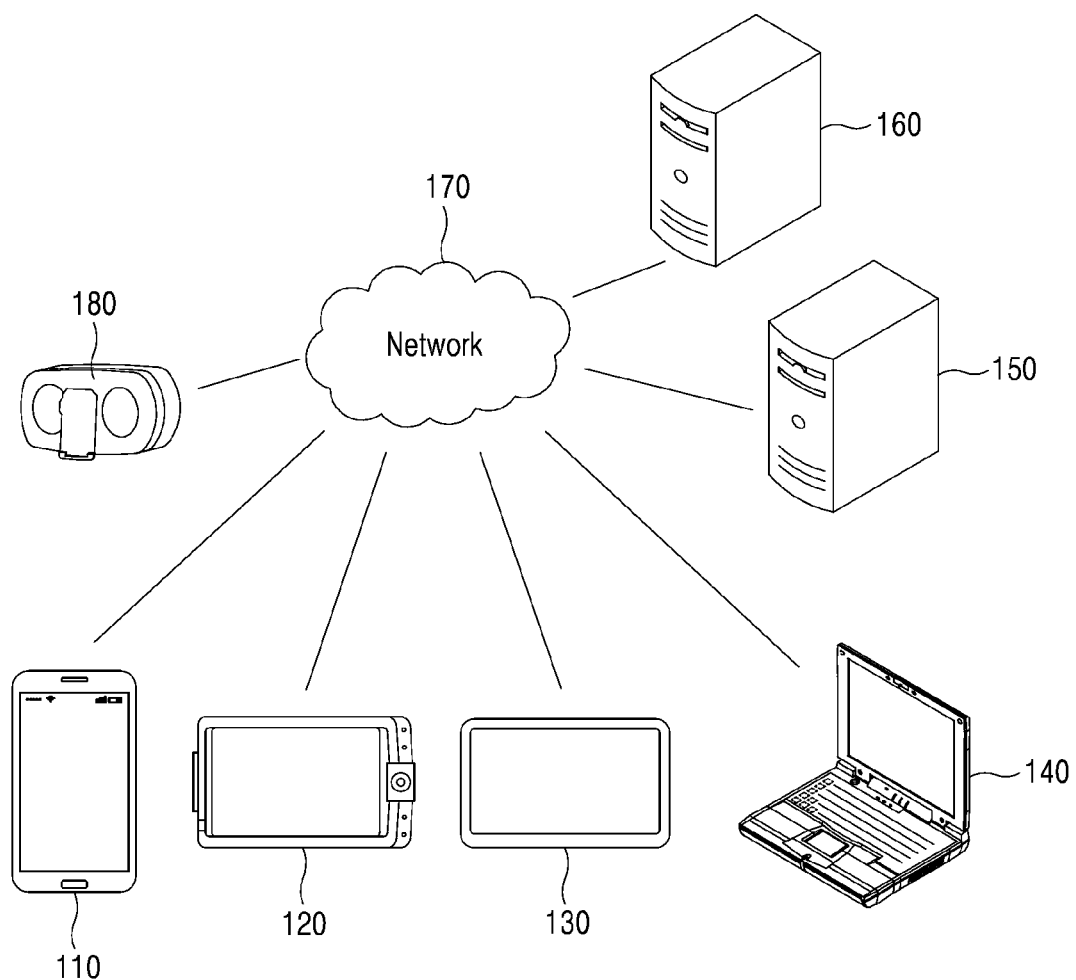
FIG. 1 illustrates an example of network environment according to an exemplary embodiment of the inventive concepts.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, one or more components may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

The exemplary embodiments of the invention relate to a technology for adjusting focusing length in order to exercise a crystalline lens and ciliary muscles of a user by changing an optical property, such as a location or curvature of lens located in barrel of VR (Virtual Reality) device or AR (Augmented Reality) device. Particularly, it relates to a technology not only decreasing the risk of false nearsightedness resulting from focusing on near distance a lot and a long-lasting fixed focus state when watching contents relating to VR (Virtual Reality) device or AR (Augmented Reality) device, but also medically enhancing vision with entertainment of watching the contents for user having low vision nearsightedness, astigmatism, or farsightedness, and the like.

In exemplary embodiments of the invention, 'object' may indicate any physical object existing in the real world and virtual contents existing in the virtual world.

In exemplary embodiments of the invention, when playing VR or AR contents on a user terminal, such as a smartphone, an application for controlling a location of lens may be installed on the user terminal for protecting the vision of a user, and a system for adjusting focusing length corresponding to VR/AR device may be installed.

In exemplary embodiments of the invention, information for adjusting focusing length relating to corresponding contents may be embedded in advance in contents, and focusing length may be adjusted by moving a location of a lens while contents are played based on information for adjusting focusing length. For example, vision setting information may be received from the user and set, and may be set in system in advance depending on substance, length, time cycle, use history, and the like of contents, and vision setting information set in advance in system may correspond to information for adjusting focusing length embedded in the contents.

FIG. 1 illustrates an example of network environment according to an exemplary embodiment of the inventive concepts. The network environment of FIG. 1 indicates an example including a plurality of electronic devices 110, 120, 130, 140, a plurality of servers 150, 160, network 170, and a system for adjusting focusing length 180. Since FIG. 1 shows only a single exemplary embodiment of the inventive concepts, the number of electronic devices or the number of servers are not limited to what is shown in FIG. 1.

The plurality of electronic devices 110, 120, 130, 140 may be fixed terminals implemented by a computer or portable terminals. Examples of the electronic devices 110, 120, 130, 140 include a smart phone, a mobile phone, a navigation unit, a computer, a laptop, a digital broadcasting terminal, a PDA (Personal Digital Assistants), a PMP (Portable Multimedia Player), a tablet PC, and the like. For example, the electronic device 110 may communicate with other electronic devices 120, 130, 140, the servers 150, 160, and/or the system for adjusting focusing length 180 through the network 170 by using a wireless or a wired communication method.

The communication method is not limited and may include not only a communication method utilizing a communication network (e.g. mobile communication network, the wired Internet, the wireless Internet, and broadcasting network), but also short-range wireless communication. For example, the network 170 may include any one or more networks including PAN (personal area network), LAN (local area network), CAN (campus area network), MAN (metropolitan area network), WAN (wide area network), BBN (broadband network), the Internet, and the like. Also, the network 170 may include any one or more among network topologies including a bus network, a star network, a ring network, a mesh network, a star-bus network, a tree or hierarchical network, and the like, but the inventive concepts are not limited thereto.

Each of the servers 150, 160 may be implemented with a computer device or a plurality of computer devices providing an instruction, a code, a file, content, a service, and the like by communicating through the plurality of electronic devices 110, 120, 130, 140 and the network 170.

For example, the server 160 may provide a file for installing an application to the electronic device 110 connected through the network 170. In this case, the electronic device 110 may install an application by using a file provided from the server 160. Also, according to control of the OS (Operating System) included in the electronic device 110 and at least one program (e.g., browser or the installed application), service or contents provided by the server 150 may be provided by connecting to the server 150. For example, when the electronic device 110 transmits a message requesting service to the server 150 through the network 170 according to control of application, the server 150 may transmit a code corresponding to the message requesting service, and the electric device 110 may provide contents by configuring and displaying a screen for code according to control of application. For example, the server 160 may transmit an application for adjusting focusing length, VR or AR contents, and the like to the electronic device 110, and the electronic device 110 may configure a screen for code according to control of the application for adjusting focusing length and provide AR or VR contents to user by displaying corresponding contents.

The electronic device 110 for displaying contents is detachable from the system for adjusting focusing length 180, and when the electronic device 110 is connected to the system for adjusting focusing length 180, the system for adjusting focusing length 180 may adjust focusing length by changing a location of a lens back and forth according to control instruction. For example, an application for adjusting focusing length may be installed on the electronic devices 110, 120, and in connection with contents displayed in the electronic devices 110, 120 by interworking with the application for adjusting focusing length, an application for controlling location of lens to be changed may be installed on the system for adjusting focusing length 180.

For example, the system for adjusting focusing length 180 may indicate a VR or AR device, and may be manufactured as a user-wearable head mount, standing, fixing, glasses types.

Figure 2:
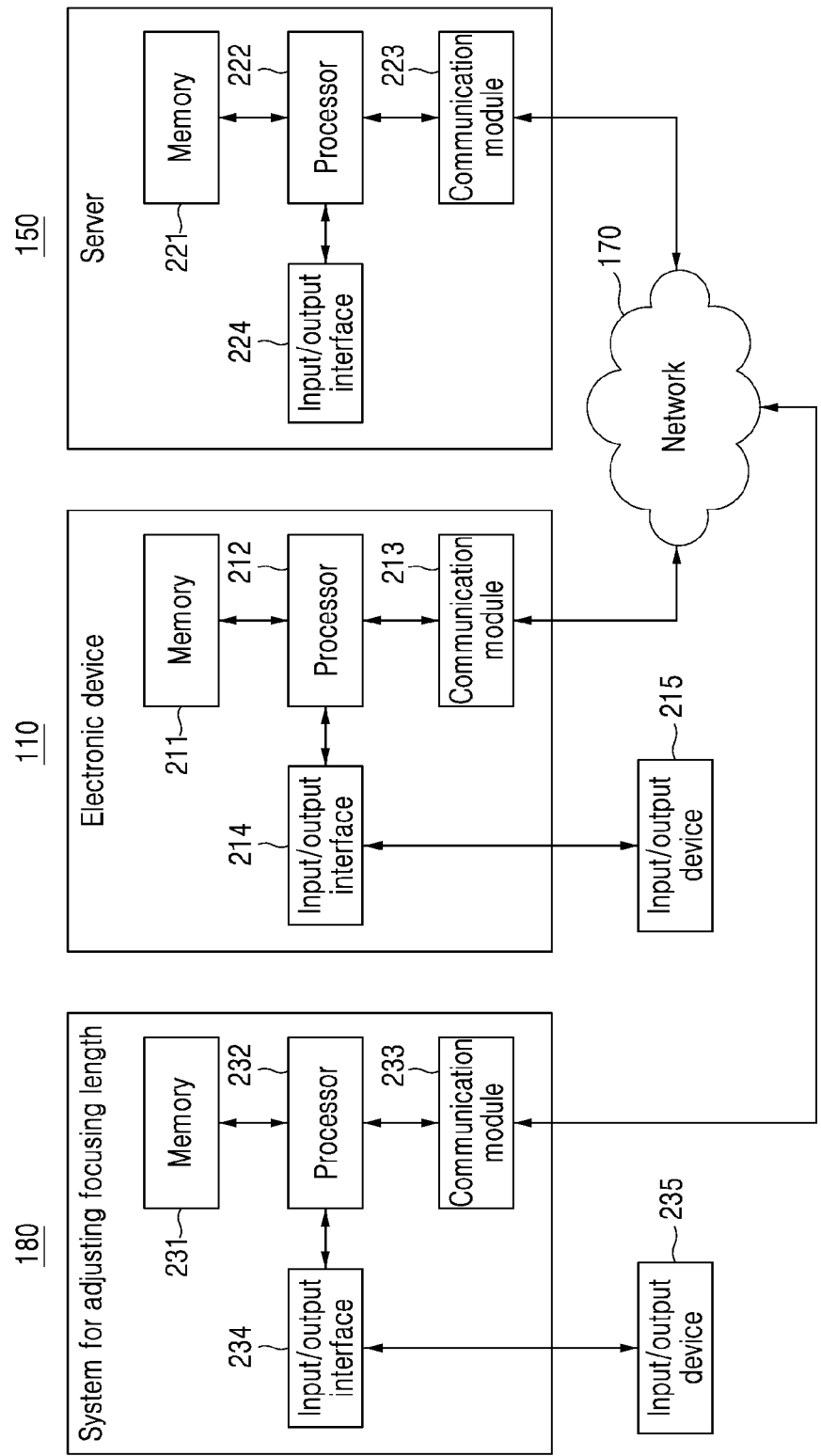
FIG. 2 is a block diagram illustrating internal configuration of electric device, server, and system for adjusting focusing length according to an exemplary embodiment of the inventive concepts.

FIG. 2 is a block diagram illustrating internal configuration of an electric device, server, and system for adjusting focusing length according to an example of embodiment. In FIG. 2, an internal configuration of the electronic device 110 as an example of one electronic device and internal configuration of the server 150 as an example of one server will be described. Other electronic devices 120, 130, 140 or the server 160 may have the same or similar internal configuration.

The electronic device 110 and the server 150 may include memories 211, 221, 231, processors 212, 222, 232, communication modules 213, 223, 233 and input/output interfaces 214, 224, 234. The memories 211, 221, 231, which are computer readable recording media, may include a permanent mass storage device, such as RAM (random access memory), ROM (read only memory), and a disc drive. Also, the memories 211, 221, 231 may store an OS (Operating System) or at least one program code (e.g. a code for the application installed and driven in the electronic device 110 and the like). The software components may be loaded from other computer-readable recording media separate from the memories 211, 221, 231. The other computer-readable recording media may include a floppy disc, a disc, a tape, a DVD/CD-ROM drive, a memory card, and the like. In other exemplary embodiments, the software components may be loaded to the memories 211, 221, 231 through the communication modules 213, 223, 233, instead of through the computer-readable recording medium. For example, at least one program may be loaded to the memories 211, 221, 231 based on a program (e.g., the described application) which is installed by files that developers or file distributing systems distributing application installation files (e.g. the described server 160) provide through the network 170.

The processors 212, 222, 232 may be configured to process instructions of computer program by performing basic arithmetic, logic, and input/output operation. The instructions may be provided to the processors 212, 222, 232 by the memories 211, 221, 231 or the communication modules 213, 223, 233. For example, the processors 212, 222, 232 may be configured to execute the instructions received in accordance with program code stored in the recording device such as the memories 211, 221, 231.

The communication modules 213, 223, 233 may provide a function for communicating the electronic device 110 and the server 150 through the network 170 and provide a function for communicating with other electronic devices (e.g. the electronic device 120) or other servers (e.g. the server 160). For example, a request (e.g., a request for vision protecting service) that the processor 212 of the electronic device 110 generates according to a program code stored in a recording device, such as the memory 211, may be transmitted to the server 150 through the network 170 according to control of the communication module 213. Conversely, a control signal or an instruction, content, a file, and the like which are provided according to control of the processor 222 of the server 150 may be received by the electronic device 110 through the communication module 213 of the electronic device 110 by going through the communication module 223 and the network 170. For example, the control signal or instruction, and the like of the server 150 received through the communication module 213 may be transmitted to the processor 212 or the memory 211, and content or file, and the like may be stored in the storage medium that the electronic device 110 may further include. Also, as the vision protecting service is provided, when control instruction for changing location of lens is generated in connection with corresponding contents through focusing adjustment application, control signal or instruction and the like changing location of lens is transmitted to the communication module 233 through the communication module 213, and the control signal or instruction and the like received through the communication module 233 may be transmitted to the processor 232 or the memory 231. The system for adjusting focusing length 180 may further include at least one lens (e.g., two or more lenses) adjusting focusing length based on a control signal or instruction, rail moving the lens, barrel including lens and rail, housing installing barrel and electronic device, and elastic band fixing the system for adjusting focusing length 180 on head of user with head mount type.

The input/output interface 214, 224, 234 may be a means for interfacing with an input/output device 215, 235. For example, an input device may include a keyboard, a mouse, etc. and key buttons provided in the system for adjusting focusing length 180, and an output device may include a device, such as a display, for displaying a communication session of an application. As another example, the input/output interface 214 may be a means for interfacing with a device in which an input function and an output function are integrated into a single function such as a touch screen. As a more specific example, when processing instructions of the computer program loaded to the memory 211, the processor 212 of the electronic device 110 may display a service screen or content configured by using data provided by the server 150 or the electronic device 120 on the display through the input/output interface 214.

Also, in other exemplary embodiments, the electronic device 110, the server 150, and the system for adjusting focusing length 180 may include additional components other than the components of FIG. 2. For example, the electronic device 110 may be implemented to include at least part of the described input/output device 215 or further include other components such as a transceiver, a GPS (Global Positioning System) module, a camera, various sensors, a database, and the like. As a more specific example, when the electronic device 110 is a smartphone, it is known that various components, such as an acceleration sensor or a gyro sensor, a camera, various physical buttons, a button-using touch panel, an input/output port, a vibrator, and the like that the smart phone usually includes may be implemented to be further included in the electronic device 110.

Figure 3:
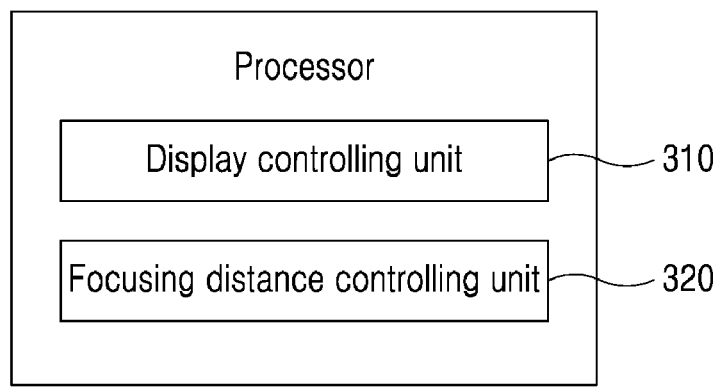
FIG. 3 illustrates an example of components that processor of system for adjusting focusing length may include according to an exemplary embodiment of the inventive concepts.
Figure 4:
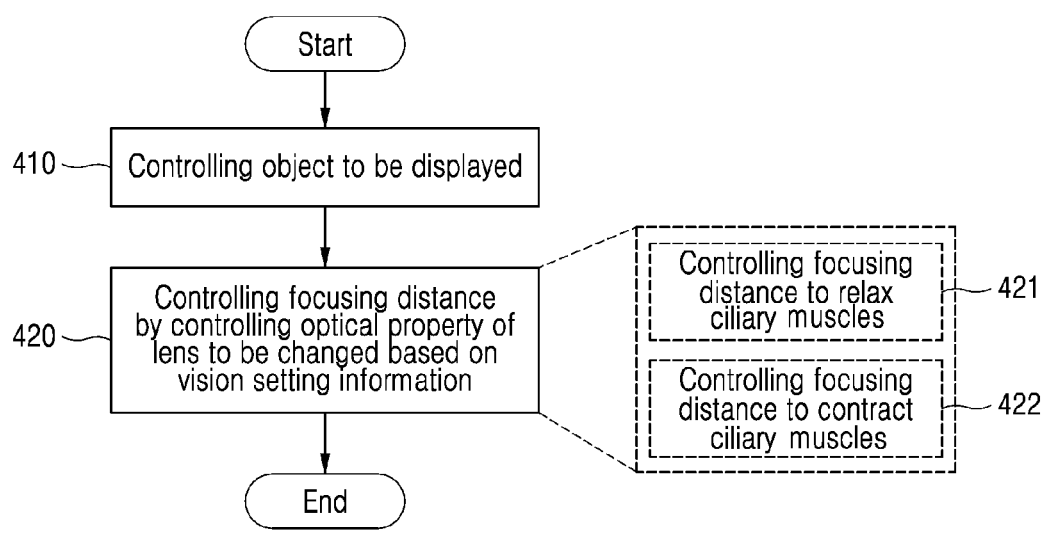
FIG. 4 is a flow chart illustrating an example of method that system for adjusting focusing length may perform according to an exemplary embodiment of the inventive concepts.

FIG. 3 illustrates an example of components that a processor 232 of a system for adjusting focusing length may include according to an exemplary embodiment, and FIG. 4 is a flow chart illustrating an example of a method of that system for adjusting focusing length may perform according to an exemplary embodiment.

FIGS. 3 and 4 describe adjusting focusing length by changing a location of a lens in a system for adjusting focusing length as an example. However, it is possible to adjust the focusing length by generating a control instruction or a signal for changing the location of the lens in the electronic devices 110, 120, which are user terminals. Then, the processor 212 of the electronic devices 110, 120 may include a display controlling unit and a focusing length controlling unit for adjusting focusing length.

As described in FIG. 3, the processor 232 of the system for adjusting focusing length 180 may include a display controlling unit 310 and a focusing length controlling unit 320 as components. The processor 232 and components of the processor 232 may control the system for adjusting focusing length 180 to perform operations 410 to 420 included in a method of FIG. 4. Here, the processor 232 and components of the processor 232 may be implemented to execute instructions according to OS (Operating System) code included in the memory 231 or at least one program code. Also, components of the processor 232 may be expressions of different functions performed by the processor 232 according to control instruction provided by an OS or at least one program. For example, the focusing length controlling unit 320 may be used as a functional expression of controlling focusing length adjustment according to the stated control instruction of the processor 232.

In operation 410 shown in FIG. 4, the display controlling unit 310 may control an object to be displayed. Here, the object may indicate a physical object (e.g., a desk, a door, a cup, and the like) of the real world recorded through a camera in a direction which moves as a user wearing the system for adjusting focusing length 180 moves his head or face up, down, left, right, diagonally, and the like, or may indicate VR/AR content images downloaded or stored in a user terminal (i.e., electronic device).

For example, when it is confirmed that the user wears the system for adjusting focusing length 180 and watches each of lenses corresponding to left eye and right eye set in the system for adjusting system 180 (i.e., when eyes of a user look at the front for a predefined length of time), the display controlling unit 310 may control an object (i.e., contents) to be displayed through a screen of a user terminal. Here, when the object corresponds to contents of a virtual world, as a head or face of a user turns left and right, the display controlling unit 310 may control a menu for selecting contents to play to be displayed in a screen by recognizing the turn through a gyro sensor and an acceleration sensor.

In operation 420, the focusing length controlling unit 320 may control a focusing length indicating distance from a virtual surface to a lens based on the virtual surface where eyes of user are located to be adjusted by changing at least one optical property of the lens based on preset or preregistered vision setting information while the selected object (i.e., contents) or object which is recorded through a camera is displayed.

Here, the focusing length controlling unit 320 may confirm a mode set on mode setting information and control focusing length adjustment. For example, mode setting information may be selected from a user through a user terminal (i.e., electronic device), and when mode setting information is in a normal mode, an operation adjusting focusing length may be stopped. Then, like general VR/AR devices, while corresponding contents are played, a lens may not automatically be moved to adjust focusing length. When it is confirmed that mode setting information is a vision protecting mode, the focusing length controlling unit 320 may control focusing length adjustment.

Here, the focusing length controlling unit 320 may control focusing length to be adjusted by physically moving the location of a lens inside of a barrel, and may control focusing length to be adjusted by electrically changing current applied to lens.

For example, when adjusting focusing length by physically moving the location of the lens, the focusing length controlling unit 320 may generate a control signal or an instruction for moving the lens located inside of the barrel back and forth along a rail based on a virtual surface where eyes of a user wearing the system for adjusting focusing length 180 are located. Then, as the lens is moved along the rail based on a corresponding control signal or instruction, focusing length may be changed.

As another example, when electrically adjusting focusing length without moving the location of a lens, focusing length may be adjusted by changing a curvature of a corresponding lens by adjusting current amount applied to each of left eye and right eye. For example, when a lens for adjusting focusing length (i.e., varifocal lens) may be made of a material such as polymer and the like instead of glass, and the polymer is located between two chambers of liquid material having different refractive indexes, focusing length may be controlled to be adjusted by changing a radius of the lens, i.e., changing a curvature of the lens, by adjusting pressure applied between the two chambers. For example, the focusing length controlling unit 320 may adjust the pressure applied to the lens by adjusting an amount of current applied to the lens by using a coil, a piezo motor, and the like. Also, as pressure applied to the lens is adjusted, finally, a radius of curvature of the lens may be changed to a focusing length. In other words, the focusing length controlling unit 320 may control focusing length adjustment by changing the radius of curvature by adjusting contraction and expansion of the polymer material by adjusting an amount of current.

Here, focusing length may be adjusted as a location of the lens or current amount applied to lens is changed based on vision setting information, and vision setting information may include at least one of information relating to contents including substance of contents and length of contents, predefined time cycle information, use history information, and vision information of user. Also, vision setting information may be set automatically in the system and may be set by the user.

In operation 421, the focusing length controlling unit 320 may control focusing length by changing the location of the lens or the current amount applied to the lens in order that focusing length is relatively long from the location of the lens (e.g., initial setting location or a location corresponding to vision of user) to relax ciliary muscles of the eyes of the user.

For example, the focusing length controlling unit 320 may control focusing length to be adjusted by generating an instruction or signal controlling the lens to be moved to a location corresponding to predefined distance (i.e., location away from eyes of user) from the original location. In other words, when a user is near-sighted, the lens may be controlled to move in order that focusing length is relatively long in order to correct nearsightedness by focusing behind the image. Then, even though the user does not look at an object, such as a tree of a long distance, ciliary muscles of the user may be relaxed when the user wearing the system for adjusting focusing length actually looks at a specific object of a long distance in a plain and the like. Besides, the focusing length controlling unit 320 may calculate a difference value between curvature corresponding to present focusing length and curvature corresponding to focusing length to be adjusted, and may control focusing length to be relatively long or short by applying an amount of current to the lens corresponding to the calculated difference value.

In operation 422, the focusing length controlling unit 320 may control focusing length by changing the location of the lens or current amount applied to the lens in order that focusing length is relatively short from the location of lens (e.g., initial setting location or location corresponding to vision of user) to contract the ciliary muscles in the eyes of the user.

For example, the focusing length controlling unit 320 may control focusing length to be adjusted by generating an instruction or signal controlling the lens to be moved to a location corresponding to a predefined distance (i.e., location close to eyes of user) from the location or controlling to change an amount of current applied to lens. In other words, when a user is far-sighted, the lens is moved or the amount of current is changed in order that the focusing length is relatively short to correct farsightedness by focusing image in front. Then, even though the user does not look at an object, such as letters in a book and the like in close distance, ciliary muscles in the eyes of the user may be contracted when the user wearing the system for adjusting focusing length actually focuses at an object of close distance.

Hereinafter, although it will be described that focusing length adjustment may be controlled by mechanically moving the lens to a different location based on vision setting information, substance and length of contents, use history information referring to FIGS. 5 to 7 as an example, it corresponds to exemplary embodiments, and besides mechanically moving location of lens, it is also obvious that focusing length adjustment is controlled by adjusting a current amount based on at least one of vision setting information, substance and length of contents, and use history information.

Figure 5:
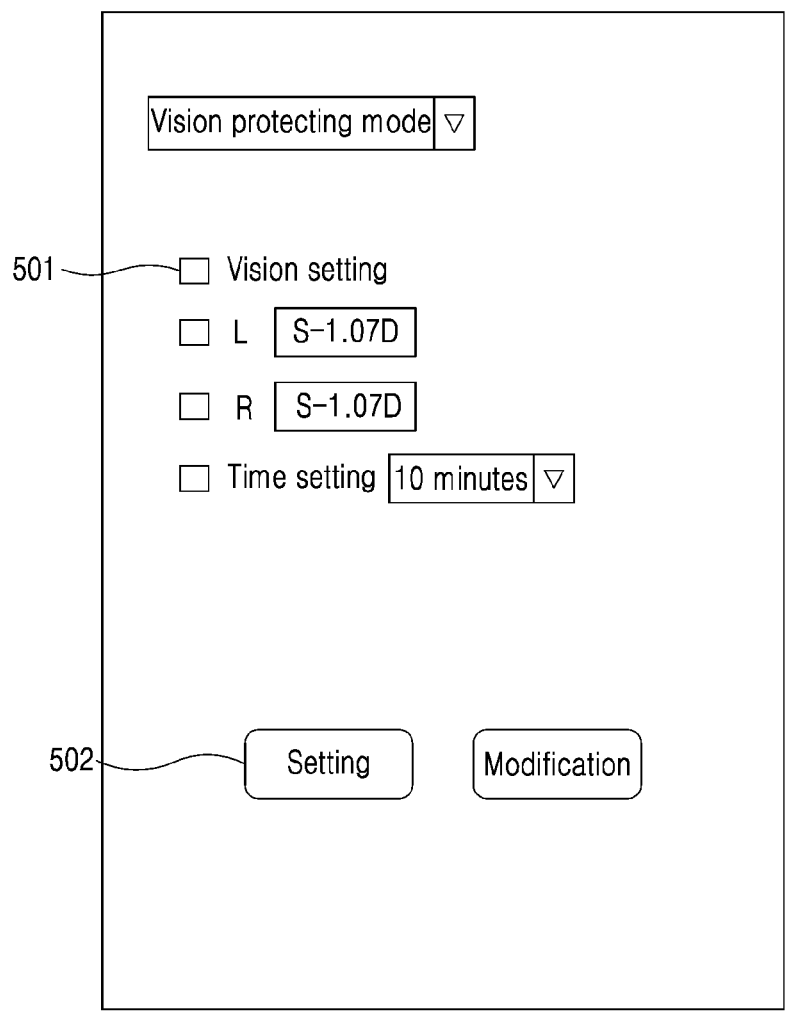
FIG. 5 is a drawing illustrating screen setting vision setting information according to an exemplary embodiment of the inventive concepts.

FIG. 5 is a drawing illustrating screen setting vision setting information according to an exemplary embodiment.

In FIG. 5, vision setting information may display a screen setting vision setting information through display of a user terminal installed on the system for adjusting focusing length 180. Here, vision setting information may be set without installing the user terminal on the system for adjusting focusing length 180, and vision setting information may be set by logging in through desktop or tablet with login account registered in a server providing corresponding application in order to be provided with service for adjusting focusing length. Here, when setting information is set with a login account, vision setting information may be periodically updated as the latest information by comparing setting dates of vision setting information stored in terminal according to a predefined time cycle through an application for adjusting focusing length and vision setting information stored in the server with the login account.

Whether mode setting information will be set as normal mode or vision protecting mode may be selected by a user through a screen 500. Normal mode indicates operation fixing focusing length with focus set for each frame of contents as same with an existing VR/AR device without operating in a vision protecting mode for adjusting focusing length, and the vision protecting mode indicates operating function for adjusting focusing length to continuously be changed every predefined time cycle.

When mode setting information is selected as the vision protecting mode, whether vision will be set or not may be selected. For example, as a check box 501 corresponding to vision setting is selected, an item for receiving input of vision of the left eye and the right eye of the user may be activated on the screen 500. In other words, input of vision of the left eye and the right eye of the user may manually be received from the user. Here, when the check box 501 is not selected, the system for adjusting focusing length 180 may automatically estimate vision of the left eye and the right eye of user based on ARK (Auto Refraction Keratometry), and focusing length adjustment may be controlled based on the estimated vision.

Also, operation performing time information for performing focusing length adjustment may be set by the user. For example, operation performing time information may be set such as 10 minutes, 20 minutes, until end time of contents, and the like. Here, when operation performing time information is not set, end time of contents may be set in advance as an initial value. In other words, control of focusing length adjustment may automatically be performed every predefined time cycle until contents end.

As display information 502 corresponding to a setting is selected, vision setting information may be set from user, and the focusing length controlling unit 320 may perform control for focusing length adjustment based on the set vision setting information. For example, when vision information of user is manually inputted, the focusing length controlling unit 320 may generate a control instruction or a signal for moving lens to location corresponding to the inputted vision information. Also, when lens is moved and a movement completion signal or instruction is received, the focusing length controlling unit 320 may generate a control instruction or signal for moving the lens in order that focusing length is relatively long or short based on the moved location. Here, focusing length adjustment may periodically be controlled to occur with a predefined time cycle (e.g., at intervals of 10 seconds, 20 seconds, and the like). Likewise, as the lens is moved, and the left eye and the right eye of the user watching the display (i.e., display of a user terminal) where contents are played are automatically trained to focus at a long distance or a near distance, nearsightedness or farsightedness may be relieved.

Likewise, user may set vision setting information, but focusing length adjustment may be controlled based on vision setting information which is preset in the system without a user setting.

For example, focusing length controlling unit 320 may control focusing length adjustment based on substance and length (i.e., play time) of contents that the user tries to play. Operation for controlling focusing length adjustment based on the substance and length of contents will be described hereinafter referring to FIG. 6.

Figure 6:
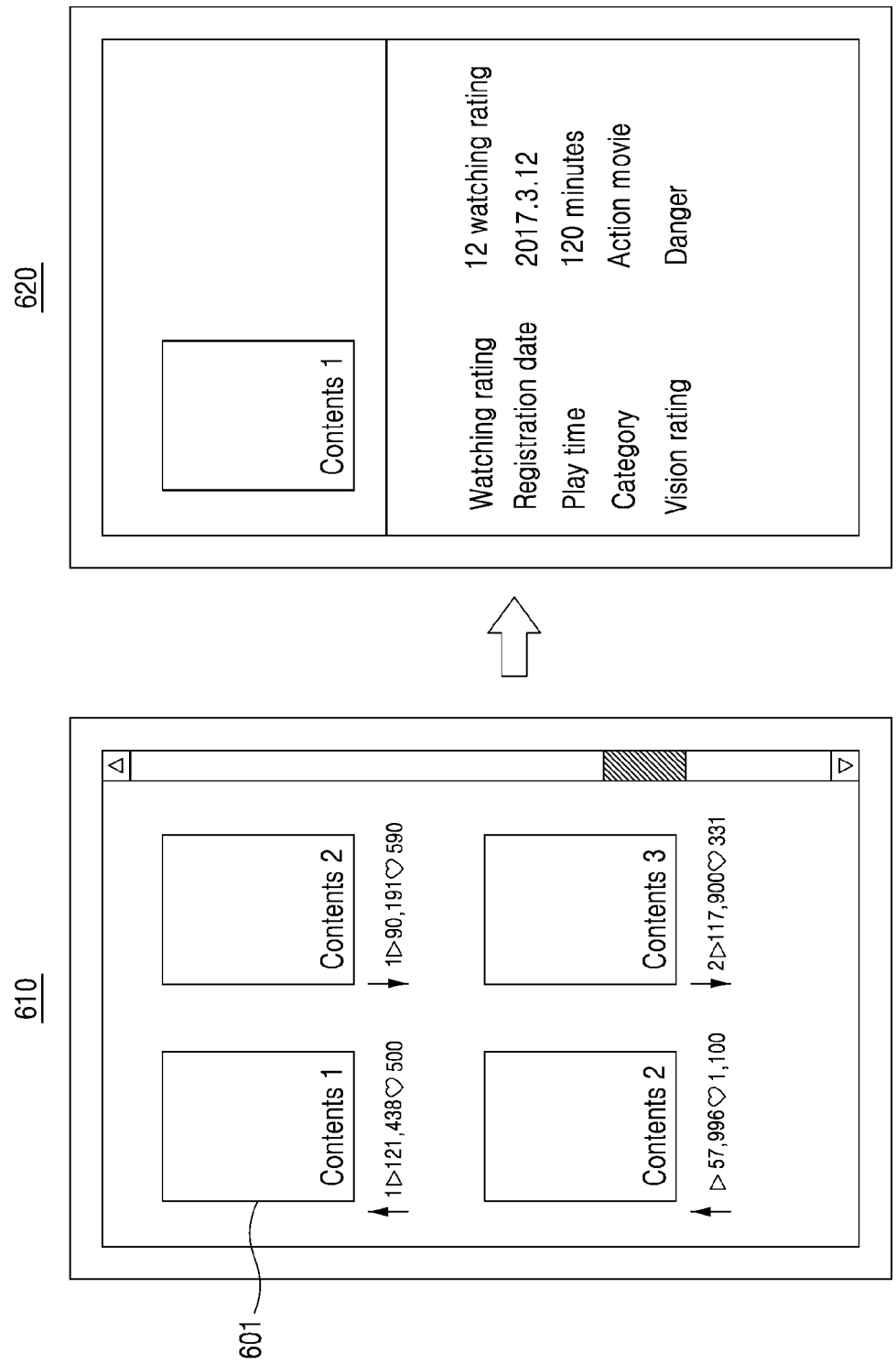
FIG. 6 is a drawing illustrating screen configuration providing selection of contents to be played according to an exemplary embodiment of the inventive concepts.

FIG. 6 is a drawing illustrating screen configuration providing selection of contents to be played according to an exemplary embodiment.

FIG. 6 displays a plurality of contents in a screen 610 in an exemplary embodiment, and a category may be classified as contents for correcting nearsightedness, contents for correcting farsightedness, contents for correcting astigmatism, and the like. Also, when a desired correction item is selected from the user, contents (e.g., contents for correcting nearsightedness) included in a corresponding category from among a plurality of contents may be selected and displayed on the screen 610.

Referring to FIG. 6, a screen used for selected contents to play through a user terminal (i.e., electronic device) installed on the system for adjusting focusing length 180 may be displayed in the screen 610 of a user terminal through an application.

Then, ranking change information, the number of downloads, and the like corresponding to each of a plurality of contents (e.g., contents relating to VR, contents relating to AR, and the like) may be displayed in the screen 610. Here, specific contents 601 to play are selected among a plurality of contents, detail information corresponding to the selected contents 601 may be displayed in a screen 620.

For example, information of watching a rating (i.e., image rating) which is preset when making the corresponding contents 601, registration date, play time information, category (e.g., action movie, romance drama, music, game, and the like), vision rating, and the like may be displayed in the screen 620 as detail information. Here, vision rating, which is information indicating the degree of loss of vision due to watching corresponding contents may be set at a predefined plurality of levels. For example, information relating to rating corresponding to degree of loss of vision of corresponding contents among a plurality of ratings from safety corresponding to the lowest degree of loss of vision to danger corresponding to the most serious degree of loss of vision may be displayed in the screen 620. For example, vision rating may be predetermined based on time of focusing to a predefined short distance over a predefined certain time and the number of times for focusing. For example, as the time is longer and the number of times is greater, vision rating may be determined as a danger rating rather than when the number of times is less.

Here, when play time of the selected contents is under a predefined reference play time, such as 1 minute, 5 minutes, and the like, a function for adjusting focusing length may not be supported. Accordingly, a sentence such as 'The corresponding contents do not support function for adjusting focusing length.' may be displayed on a predefined area (e.g., bottom area of screen, or right side of image of corresponding contents) on the screen 620 of the user terminal.

Also, when an image corresponding to long distance focus is included in corresponding contents at above a predefined rate than image corresponding to a short distance focus based on substance (i.e., property information) of the selected contents, the focusing length controlling unit 320 may control focusing length adjustment to perform short distance focus relatively more than long distance focus based on the rate. Similarly, when image corresponding to short distance focus is included in corresponding contents at above a predefined rate than image corresponding to long distance based on substance (i.e., property information) of the selected contents, the focusing length controlling unit 320 may control focusing length adjustment to perform long distance focus relatively more than short distance focus based on the rate.

Here, when there is vision information inputted from the user and corresponding vision information corresponds to nearsightedness such as S−1.07 D, the focusing length controlling unit 320 may perform long distance focus control to change location of lens in order that focusing length is long to improve nearsightedness of the user even though image rate corresponding to long distance focus is high in substance of contents. Then, nearsightedness may be improved because ciliary muscles of the eyes of the user are periodically relaxed, and the image is focused behind while contents are played, and effect looking long distance is generated. Similarly, when vision information of user corresponds to farsightedness, such as S+1.36 D, the focusing length controlling unit 320 may perform short distance focus control to change the location of the lens in order that the focusing length is short to improve farsightedness of the user even though image rate corresponding to short distance focus is high in substance of contents. Then, farsightedness may be improved because ciliary muscles of the eyes of the user are periodically contracted and the image is focused in front while contents are played, and effect looking short distance is generated.

Figure 7:
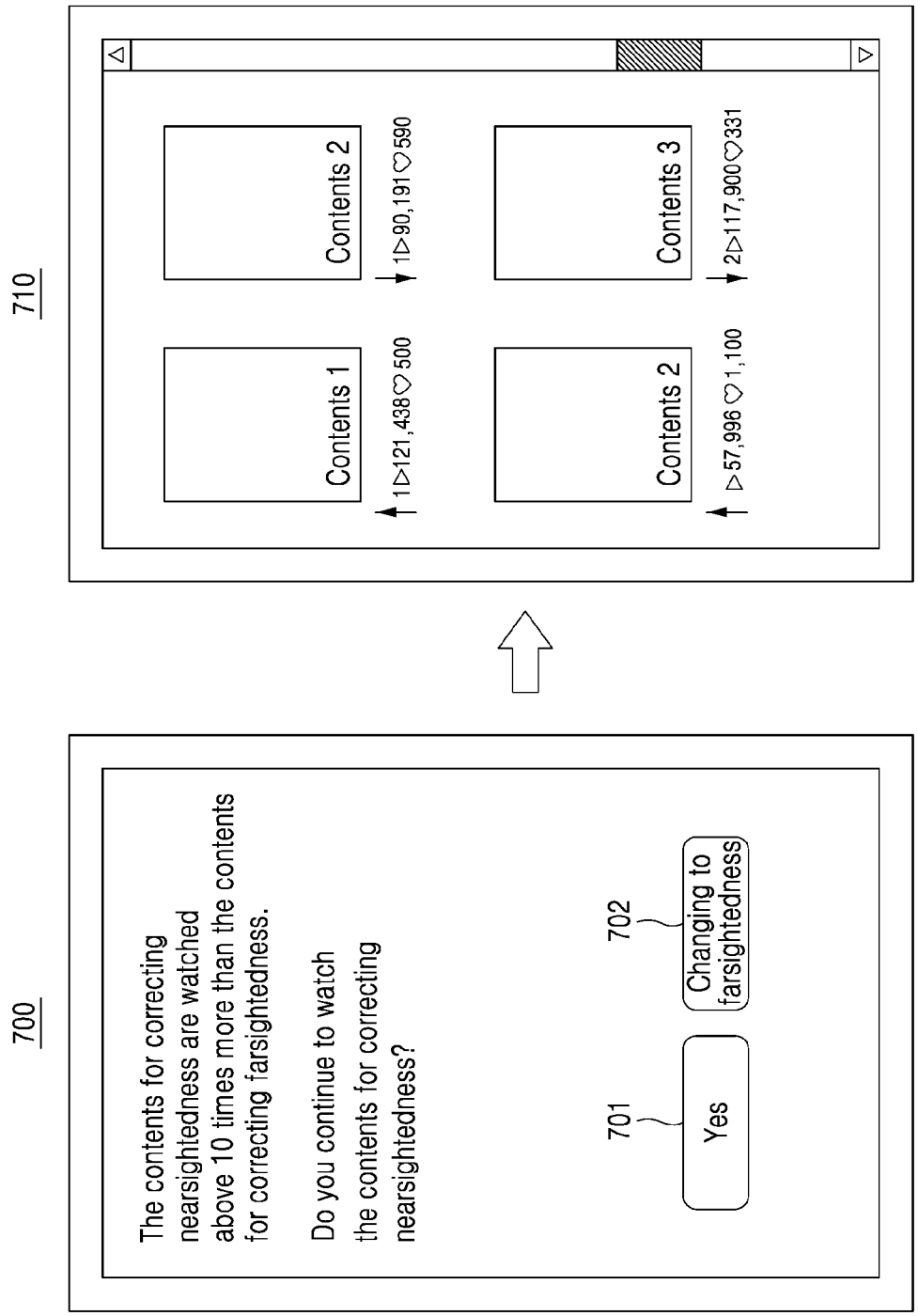
FIG. 7 is a drawing provided for describing operation controlling adjustment of focusing length based on use history information according to an exemplary embodiment of the inventive concepts.

FIG. 7 is a drawing provided for describing operation controlling adjustment of focusing length based on use history information according to an exemplary embodiment.

Identifier information of contents that the contents to be played are selected and played and finished to play may be matched with identifier information of a user, and the matched information may be stored and maintained. For example, login account (ID), nickname, or hospital registration number, and the like of a user may be used as identifier information of the user. After that, when VR contents or AR contents and the like are selected (e.g., after certain time passes, when same contents or different contents to previously played contents are selected), the focusing length controlling unit 320 may adjust focusing length by comparing the number of playing contents for correcting nearsightedness and the number of playing contents for correcting farsightedness based on use history information.

For example, when contents to be played are contents for correcting nearsightedness, and the corresponding contents are selected, the focusing length controlling unit 320 may confirm use history information. Here, when the number of playing contents for correcting nearsightedness and the number of playing contents for correcting farsightedness are compared based on use history information, and a difference of the number of watching the two contents corresponds to above a predefined reference number of playing (e.g., 10 times), for example, when contents for correcting nearsightedness are watched more than ten times more than contents of correcting farsightedness, the display controlling unit 310 may control a message to be displayed such as 'The contents for correcting nearsightedness are watched above 10 times more than the contents for correcting farsightedness. Do you want to continue to watch the contents for correcting nearsightedness?' and the like through a screen 700. Here, when display information 701 corresponding to 'Yes' is selected, the display controlling unit 310 may control the selected contents for correcting nearsightedness to be displayed, and the focusing length controlling unit 320 may control location of lens to be moved in order that focusing length is relatively long from location where the lens is located to relax ciliary muscle. When the display information 701 corresponding to 'No' is selected, the display controlling unit 310 may display contents included in farsightedness correction, such as a screen 710. Also, contents selected among displayed contents may be displayed. Then, the focusing length controlling unit 320 may control the location of lens in order that focusing length is relatively short from a location where the lens is located to contract ciliary muscles of the eyes of a user.

In other words, for nearsightedness correction for medical purposes, even though contents for correcting nearsightedness are played above the reference times, contents for correcting nearsightedness need to be consistently played for correcting nearsightedness of the user. Accordingly, when the display information 701 corresponding to 'Yes' is selected, contents for correcting nearsightedness are continuously displayed, and focusing length adjustment may be controlled in order that focusing length is long to correct nearsightedness, i.e., to relax ciliary muscle like looking at long distance.

On the other hand, when the user having normal vision tries to prevent loss of vision by playing VR/AR contents, not for medical purposes, contents for correcting farsightedness may be controlled to be preferentially displayed in case that a plurality of contents is displayed to select contents to be played when a difference value of the number of playing contents for correcting nearsightedness and the number of contents for correction farsightedness is above the reference number of times and contents for correcting nearsightedness are played more often based on use history information. In other words, use history information may be confirmed at first on a screen displaying a plurality of contents in order that contents to be displayed are selected rather than confirming use history information after contents to be played are selected. Also, when the number of playing contents for correcting nearsightedness is played much more the reference number of times than the number of playing contents for playing farsightedness through the confirmation, contents may be automatically classified on a screen for selecting contents and contents for correcting farsightedness may be displayed.

Likewise, focusing length may be adjusted by confirming user use history information at the time for selecting contents to be played when AR/VR and the like contents are played for user having normal vision, and furthermore, focusing length may be adjusted by confirming the number of focusing length adjustment during playing. For example, while the selected contents are played, the focusing length controlling unit 320 may compare the number of focusing length adjustment for correcting nearsightedness and the number of focusing length adjustment for correcting farsightedness every predefined time cycle up to the present time. Here, whenever focusing length is adjusted while contents are played, the number of focusing length adjustment for nearsightedness or farsightedness may be counted. Then, when a difference value of the number of focusing length adjustment for nearsightedness and the number of focusing length adjustment for farsightedness is above the reference value, the focusing length controlling unit 320 may control focusing length adjustment in order that the number of correction corresponding to the smaller number of adjustment increases. For example, when the number of focusing length adjustment for correcting nearsightedness is smaller than the number of focusing length adjustment for correcting farsightedness, the focusing length controlling unit 320 may control location of lens to be moved to perform focusing length adjustment for correcting nearsightedness until next time cycle.

Figure 8:
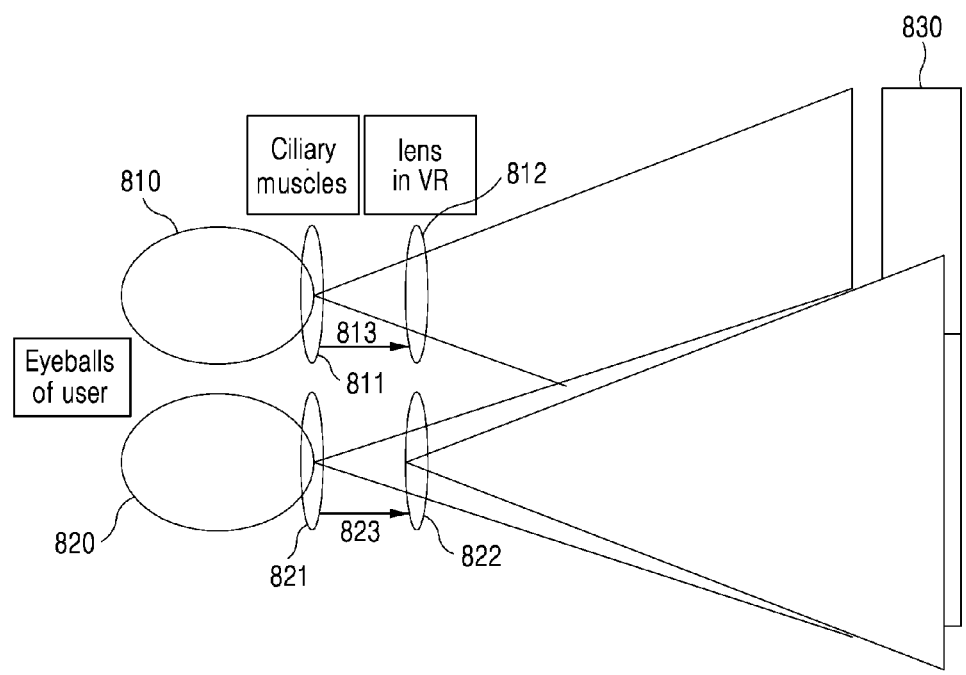
FIG. 8 is a drawing provided for describing operation controlling adjustment of focusing length by moving lens according to an exemplary embodiment of the inventive concepts.

FIG. 8 is a drawing provided for describing operation controlling adjustment of focusing length by moving the lens according to an exemplary embodiment.

According to FIG. 8, when eyeballs (i.e., left eye and right eye) of a user wearing the system for adjusting focusing length 180, i.e., eyes stare at lenses 812, 822 in front, focusing lengths 813, 823 may be adjusted by moving the lenses 812, 822 corresponding to each of left and right based on a virtual surface where eyes of the user are located along a rail.

For example, for correcting nearsightedness, because ciliary muscles 811, 821 of the eyes relax when looking at a long distance for an extended period of time, focusing lengths 813, 823 may be adjusted to be relatively long by moving the lenses 812, 822 from the present location to a display 830 of user terminal to relax the ciliary muscles 811, 821. For correcting farsightedness, because ciliary muscles 811, 821 contract when focusing and looking at a short distance, focusing lengths 813, 823 may be adjusted to be relatively short by moving the lenses 812, 822 from the present location to a far side (i.e., eyes of user) from the display 830 of the user terminal to contract ciliary muscles 811, 821.

Likewise, loss of vision may be prevented or decreased, and ultimately vision may be enhanced by training to continue relaxation and contraction exercise of ciliary muscles 811, 821 while contents are played by consistently adjusting focusing length to be long or short based on a virtual surface corresponding to eyeballs of user (i.e., crystalline lens or ciliary muscles) by moving the lenses 812, 822 back and forth along rail.

Figure 9:
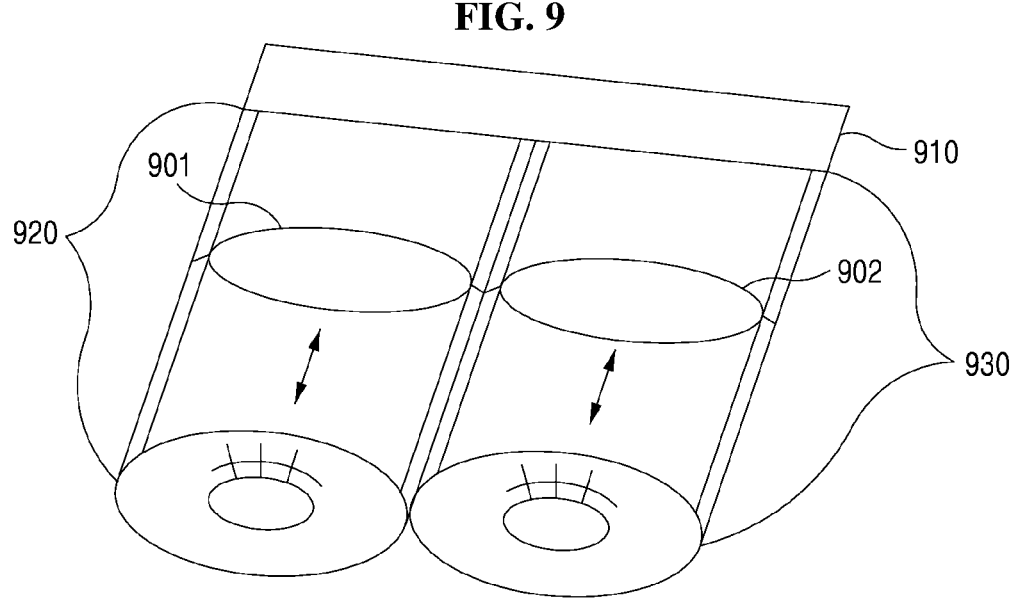
FIG. 9 is a drawing illustrating configuration of barrel where lens is placed according to an exemplary embodiment of the inventive concepts.

FIG. 9 is a drawing illustrating configuration of barrel where lens is placed according to an exemplary embodiment.

In FIG. 9, although it is illustrated that two lenses are located in each of left eye and right eye, it is merely an example, and three or more lenses or one lens may be used to adjust focusing length. For example, in FIG. 9, a zoom lens is located at a point where eyes of a user are located, a varifocal lens is located separately from the zoom lens is illustrated, and focusing length may be controlled by moving varifocal lens inside of a barrel.

Referring to FIG. 9, a display 910 (i.e., user terminal) playing contents may be installed on the system for adjusting focusing length 180 at a point separated a predefined certain distance from a point where eyes of user are located. For example, a housing in a form of slide or opening and closing cover may be formed at one side of barrels 920, 930. Also, cover cushion where both eyes of user wearing the system for adjusting focusing length 180 are located may be located at the other side of barrels 920, 930. Rail moving lenses 901, 902 may be located at both sides in each of the barrels 920, 930 corresponding to both eyes of user, and focusing length may be adjusted by moving the lenses 901, 902 along the rail. Here, the degree of vision correction may be elaborate, and high compression lens may be used to treat excessive nearsightedness, astigmatism, and squint or ophthalmologic disease combined with two or more thereof. Also, the barrels 920, 930 may be long as compressibility of the lens increases and size of the lens increases.

As described above, focusing length may be adjusted based on substance and length of contents and use history information, and a predefined time cycle, and brightness and illuminance of an object may be controlled to protect the vision of a user.

Figure 10:
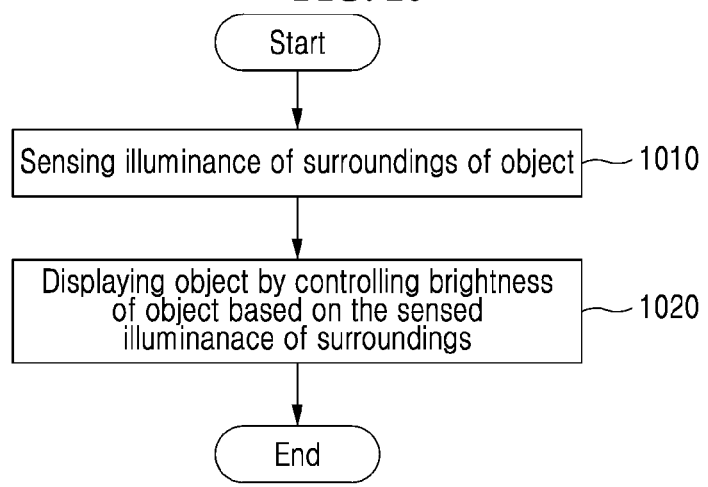
FIG. 10 is a flow chart illustrating operation adjusting brightness of object based on illuminance of surroundings according to an exemplary embodiment of the inventive concepts.

FIG. 10 is a flow chart illustrating operation adjusting brightness of object based on illuminance of surroundings according to an exemplary embodiment.

In operation 1010, illuminance of surroundings where an object (e.g., physical object existing in real world) recorded through a camera is located may be sensed through an illumination sensor provided in a user terminal or the system for adjusting focusing length.

In operation 1020, the display controlling unit 310 may control an object to display or contents image to be displayed by adjusting brightness of the object and contents image based on illuminance of surroundings where the object is located.

For example, a plurality of levels of illuminance may be predefined, and a brightness value corresponding to each of the illuminance levels may be predefined. Then, the display controlling unit 310 may determine whether the sensed surrounding illuminance corresponds to which level of the predefined plurality of levels. When the corresponding level is determined, the display controlling unit 310 may control the brightness of the object or played contents image with brightness value corresponding to the determined level. The object or contents may be controlled to be displayed with the controlled brightness.

For example, when sensed illuminance of surroundings is low because of night or cloudy weather, the brightness of an object may be adjusted from corresponding brightness to brightness value for protecting vision. Watching TV with very bright brightness in a dark environment may cause loss of vision to occur because of increasing eye strain, and although playing contents with very low brightness, loss of vision may occur because of blurred image. Accordingly, the display controlling unit 310 may control display by adjusting brightness of at least one of an object (object in real world) and contents (object in virtual world) based on a brightness value for protecting vision for each of predefined illuminance levels based on ophthalmology clinical information and the like. For example, an object and virtual contents may be displayed in a combined form, and the display controlling unit 310 may control the object and contents to be displayed by adjusting the brightness of the object and the brightness of the contents.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The exemplary embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

According to exemplary embodiments, a method and system for adjusting focusing length to enhance vision may prevent or decrease loss of vision of a user by adjusting focusing length of a lens by periodically changing optical properties (physical location of lens or electrically curvature of lens) based on vision setting information when watching contents while wearing AR (Augmented Reality) and VR (Virtual Reality) devices.

Also, according to exemplary embodiments, a method and system for adjusting focusing length to enhance vision may enhance vision of a user by exercising ciliary muscles and the crystalline lens of the eyes of a user by moving a location of a lens back and forth based on a location corresponding to vision information, or electrically changing a curvature of the lens based on vision information of a user for medical purposes.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method for adjusting focusing length in a Virtual Reality (VR) device or an Augmented Reality (AR) device, comprising:
   controlling an object to be displayed; and
   adjusting a focusing length from a lens to a virtual surface where eyes of a user are located based on vision setting information while an object is displayed,
   wherein:
   vision setting information includes at least one of information relating to contents, predefined time cycle information, use history information, and vision information of the user;
   the adjusting a focusing length comprises at least one of:
     physically moving a location of the lens within a barrel of the VR device or the AR device; and
     changing a curvature of the lens;
   the controlling the object to be displayed includes:
   providing a vision rating defined as a predefined plurality of levels of vision loss due to watching the object;
   providing a user interface for selecting one of:
     a normal mode for fixing the focusing length with a focus set for each frame with respect to the object to be displayed; and
     a vision protecting mode for adjusting the focusing length to be continuously changed every predefined time cycle with respect to the object to be displayed; and the user interface receives mode selection information on the selected mode from the user through a user terminal.

2. The method of claim 1, wherein the adjusting focusing length adjusts the focusing length by changing a location of the lens.

3. The method of claim 1, wherein the adjusting focusing length adjusts the focusing length by changing the curvature of the lens by changing a current amount applied to the lens.

4. The method of claim 2, wherein the adjusting focusing length adjusts the focusing length by changing the location of the lens such that the focusing length is relatively long from an original location of the lens in order to relax ciliary muscles in the eyes of the user.

5. The method of claim 2, wherein the adjusting focusing length adjusts the focusing length by changing the location of the lens such that the focusing length is relatively short from the original location of the lens in order to contract ciliary muscles in the eyes of the user.

6. The method of claim 1, wherein the adjusting focusing length comprises:
   adjusting a location of the lens based on left and right vision information of the user registered through the user terminal; and
   adjusting the location of the lens again in order to adjust the focusing length based on the adjusted location.

7. The method of claim 1, wherein the adjusting focusing length adjusts the focusing length based on at least one of substance of contents and length of contents when the object to be displayed is contents.

8. The method of claim 1, wherein the adjusting focusing length adjusts the focusing length by comparing a number of playing contents for correcting nearsightedness and a number of playing contents for correcting farsightedness based on the use history information.

9. The method of claim 1, wherein the adjusting an object to be displayed displays the object by adjusting brightness of the object based on illuminance of surroundings where the object is located.

10. The method of claim 1, wherein the adjusting focusing length comprises:
   stopping an operation of adjusting the focusing length when mode setting information is the normal mode; and
   adjusting the focusing length to be every predefined time cycle when mode setting information is the vision protecting mode.

11. The method of claim 1, wherein the adjusting focusing length adjusts the focusing length by moving the lens back and forth along a rail placed inside of the barrel where the lens is located based on the virtual surface in a state that eyes of the user stare forward.

12. The method of claim 1, wherein the adjusting focusing length comprises:
   estimating vision of the user staring at the lens based on ARK (Auto Refraction Keratometry); and
   adjusting the focusing length based on the estimated vision.

13. The method of claim 1, wherein contents including the displayed object are set in advance with watching rating, play time, and vision rating indicating whether vision is decreased due to watching of contents.

14. A system for adjusting focusing length in a Virtual Reality (VR) device or an Augmented Reality (AR) device, comprising:
   a display controlling unit configured to control an object to be displayed; and
   a focusing length controlling unit configured to adjust a focusing length from a lens to a virtual surface where eyes of a user are located based on vision setting information while an object is displayed,
   wherein:
   vision setting information includes at least one of information relating to contents, predefined time cycle information, use history information, and vision information of the user;
   the adjusting a focusing length comprises at least one of:
      physically moving a location of the lens within a barrel of the VR device or the AR device; and
      changing a curvature of the lens;
   the display controlling unit is configured to display a vision rating defined as a predefined plurality of levels of vision loss due to watching the object;
   the system further includes a user interface configured to select one of:
      a normal mode for fixing the focusing length with a focus set for each frame with respect to the object to be displayed; and
      a vision protecting mode for adjusting the focusing length to be continuously changed every predefined time cycle with respect to the object to be displayed; and the user interface receives mode selection information on the selected mode from the user through a user terminal.

15. The system of claim 14, wherein the focusing length controlling unit is configured to adjust the focusing length by changing a location of the lens.

16. The system of claim 14, the focusing length controlling unit is configured to adjust the focusing length by changing the curvature of the lens by changing an amount of current applied to the lens.

17. The system of claim 15, the focusing length controlling unit is configured to adjust the focusing length by changing the location of the lens such that the focusing length is relatively long from an original location of the lens in order to relax ciliary muscles in the eyes of the user.

18. The system of claim 15, wherein the focusing length controlling unit is configured to adjust the focusing length by changing the location of the lens such that the focusing length is relatively short from an original location of the lens in order to contract ciliary muscles in the eyes of the user.

19. The system of claim 14, wherein the focusing length controlling unit is configured to change the location of the lens based on the vision setting information including left and right vision information of the user registered through the user terminal displaying the object, and is configured to adjust the location of lens again to adjust the focusing length based on the changed location.

20. The system of claim 14, wherein the focusing length controlling unit is configured to adjust the focusing length based on at least one of substance of contents and length of contents when the displayed object is contents.

* * * * *